United States Patent [19]

Moretti

[11] Patent Number: 4,581,481

[45] Date of Patent: Apr. 8, 1986

[54] GUARD RING FOR LONG-DISTANCE TRANSMISSION LINES

[75] Inventor: Erminio Moretti, Grenoble, France

[73] Assignee: A. Raymond, Lorrach, Fed. Rep. of Germany

[21] Appl. No.: 608,896

[22] Filed: May 10, 1984

[30] Foreign Application Priority Data

May 13, 1983 [DE] Fed. Rep. of Germany ....... 3317445

[51] Int. Cl.$^4$ .......................... H02G 7/16; H01B 7/28
[52] U.S. Cl. ...................... 174/135; 16/109; 24/487; 29/235; 29/243.56; 29/268; 29/811; 174/40 R; 206/340; 206/493; 221/312 A
[58] Field of Search ............... 174/40 R, 127, 135; 16/108, 109; 24/114.5, 456, 487; 206/340, 493; 221/312 A; 248/74.1

[56] References Cited

U.S. PATENT DOCUMENTS 3,641,251 2/1972 Liao ............................ 174/40 R
3,801,726 4/1974 Kurihara et al. ................ 174/40 R

FOREIGN PATENT DOCUMENTS 3106794 9/1982 Fed. Rep. of Germany ..... 248/74.1

54-71380 6/1979 Japan .................................. 174/127

Primary Examiner—Laramie E. Askin
Attorney, Agent, or Firm—Finnegan, Henderson, Farabow, Garrett & Dunner

[57] ABSTRACT

A guard ring for long distance transmission cables for preventing wet snow from accumulating on the cables. The guard ring consists of two half collars of a hard elastic plastic material integrally joined by a hinge strap at one end and having interlocking hooks at their free ends to form a closed ring that tightly encloses the cable. Beaks or the like are integral with the inner ends of the half collars and face each other in the area of the hinge. The beaks cover a part of the hinge strap from both sides, so that when the half collars are open, they form, together with the hinge strap, a T-shaped groove for conveniently holding the rings in a row, prior to assembly, on a corresponding T-shaped rail. When the half-collars are closed and the ring secured to the cable, the beaks are bent apart a sufficient distance so that the rings can easily be removed from the rail. An assembly tool is also provided for clamping the rings about the cable.

5 Claims, 8 Drawing Figures

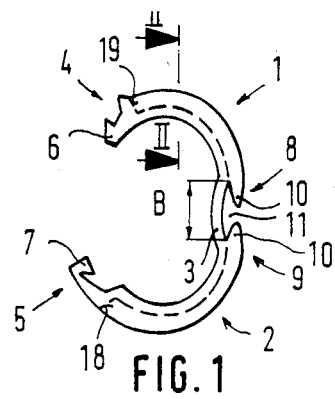
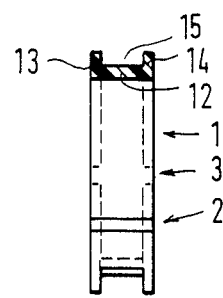
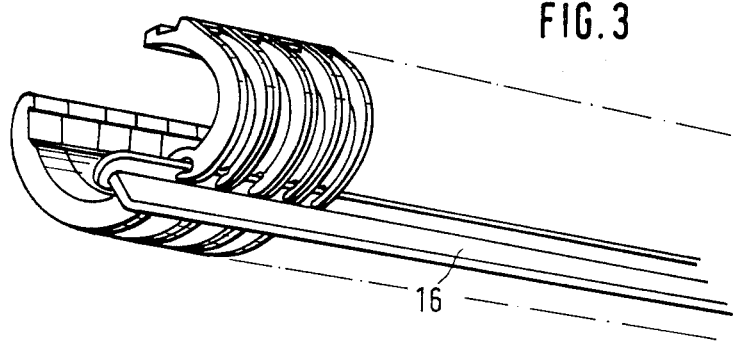
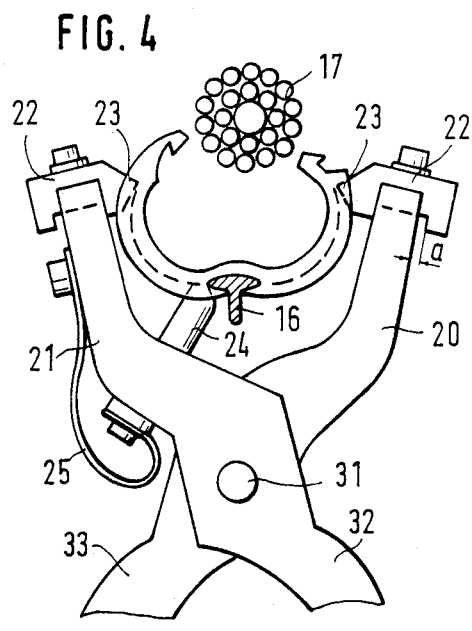
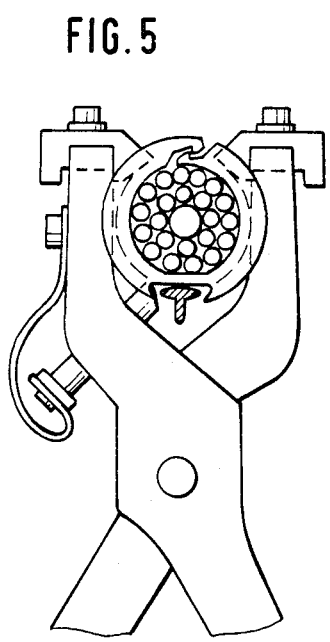

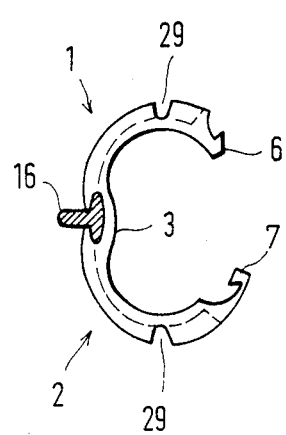
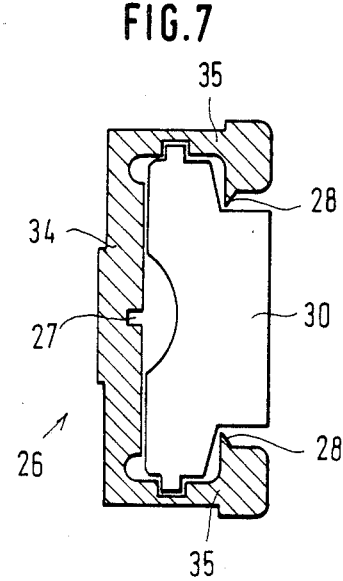
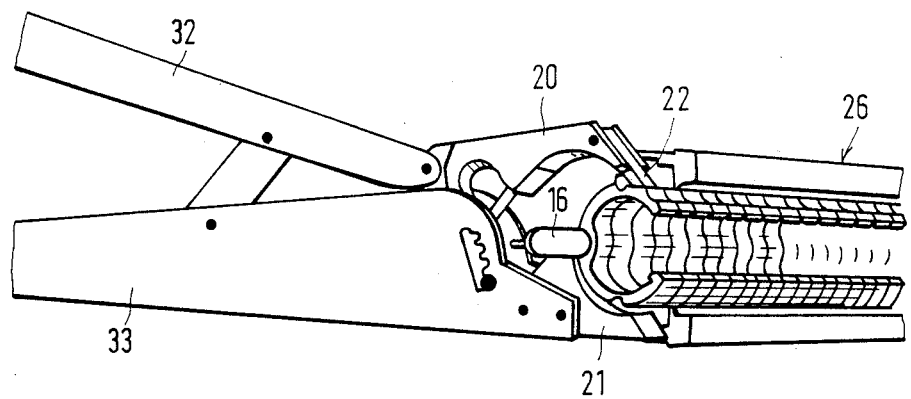

GUARD RING FOR LONG-DISTANCE TRANSMISSION LINES

BACKGROUND OF THE INVENTION

This invention relates to a guard ring for preventing wet snow from accumulating on the surface of long-distance transmission cable. These transmission cables are generally composed of a number of stranded round component wires having spiral grooves on their outer periphery. Typically, these guard rings are made of plastic, rubber or similar materials and are mounted on the cable at spaced intervals about one twist length apart to prevent wet snow from forming a tubular layer around the cable.

An example of a such guard ring is shown in U.S. Pat. No. 3,801,726. As noted in this patent, it was found that within a critical temperature range from 0° C. to +2° C., the wet snow being deposited along the turns of the cable slips underneath the line where it remains suspended on account of adhesion to the cable thereby allowing more and more wet snow to accumulate on the line. As a result, the line is circularly enclosed by an ever growing jacket of snow which in time subjects the line and supporting poles to abnormal loads causing the line poles to fail and bend over one after the other.

The guard rings of the aforementioned U.S. patent have a break at one location and in a pre-assembly state have a smaller inside diameter than the outside diameter of the line. In assembly, the open ends of the ring are separated at the break and the rings placed around the line, after which the ends are snapped back so that the ring will tightly and circularly clamp the line. However, this kind of assembly fails to provide a firm seat on the line and also requires a laborious manual mounting step.

SUMMARY OF THE INVENTION

Accordingly, an object of the present invention is to provide a new and improved guard ring of the type described above for spirally wound transmission cables that can economically, rapidly and easily be set on the cable and that tightly grips the cable.

Another object of the invention is to provide suitable accessories for rapidly assembling the guard rings in a problem-free manner, both as regards retrofitting extant long-distance transmission lines on site as well as fitting cables with the rings before they are wound onto a cable drum.

To solve these problems and accomplish these objects, the invention provides a guard ring for transmission cables for preventing snow accumulations on the cable surface, comprising two half collars constructed of a hard, elastic plastic integrally joined at their inner ends by a hinge strap that permits the collars to move between open and closed positions; interlocking means at the free, outer ends of the collars that engage to form a closed ring around the cable, beaks integral with the inner ends of the half collars and facing each other in the area of the hinge, the beaks partially covering the hinge strap from both sides in such a manner that the beaks together with the hinge strap form a T-shaped groove when the half collars are in the open position and which beaks separate a distance approximately equal to the width of the top of the T-shaped groove when the half collars are in closed position.

BRIEF DESCRIPTION OF THE DRAWINGS

The drawings show various illustrative embodiments of the guard ring and of accessories for its assembly, which will be described in further detail below, wherein:

FIG. 1 is a sideview of a guard ring constructed according to the invention in open position;

FIG. 2 is a sectional view taken along the line II—II of the guard ring of FIG. 1;

FIG. 3 shows several guard rings slipped onto a holding rail and ready for use;

FIG. 4 shows an open guard ring before it is placed around and pressed against the cable with the assembly device of this invention;

FIG. 5 shows the guard ring after it has been closed by the assembly device;

FIG. 6 shows a preferred embodiment of the guard ring;

FIG. 7 shows a magazine in cross-section for receiving guard rings of FIG. 6; and FIG. 8 shows an assembly device mounted to and for use with the magazine of FIG. 7.

DETAILED DESCRIPTION

The guard ring shown in FIGS. 1–3 essentially consists of two half-collars 1 and 2 integrally joined to each other at their inner ends and at the base of the ring, by a hinge strap 3 and provided at their outer-free ends 4 and 5 with interlocking means, such as cooperating hooks 6 and 7. The guard ring is made of a hard, elastic plastic material and is normally biased in an open position. Its purpose is to prevent wet-snow accumulations on cables 17 of long-distance transmission lines.

For that purpose the half-collars 1 and 2 are slipped around line cable 17 and the ends 4 and 5 are pressed together manually or with an assembly tong, to be described in detail below, until the cooperating hooks 6 and 7 snap shut. It is important that the inside diameter of the closed guard ring be somewhat smaller than the outside diameter of the cable 17 so that the ring will tightly grip the cable and not slip sideways on account of the load applied by the snow, especially not in the sagging part of the cable that is between two poles.

Preferably the half collars 1 and 2 each consists of an arcuate band 12, having the thickness of the hinge strap 3, and integral sidewalls 13 and 14, acting as reinforcing ribs which together with band 12 form an outwardly facing U-shaped channel having a groove 15. See FIG. 2. This provides good strength to the collars. The collars also have end walls 19 and 18 integral with sidewalls 13 and 14 at the ends of the grooves 15 adjacent outer ends 4 and 5, respectively, of the collars for assemblying the rings around the cable.

Sidewalls 13 and 14 are interrupted in the area of hinge strap 3 by a T-shaped groove 11 for receiving a T-shaped holding rail 16 as shown in FIG. 3. Groove 11 is formed by beaks 10 or the like shaped into or integral with the mutually facing inner ends 8 and 9 of half collars 1 and 2 adjacent hinge strap 3 which partially cover the hinge strap as shown in FIG. 1.

When the two half collars 1 and 2 are compressed together, beaks 10 are bent apart approximately to the width "B" of groove 11, whereby the guard ring can be easily removed from the holding rail 16. See FIG. 5. In the present embodiment, opening of groove 11 during assembly is further enhanced by the hinge strap 3 being cambered inwardly in a direction opposite to the arc of half collars 1 and 2, as best shown in FIGS. 1 and 4.

Due to this T-shaped groove in the base of the guard rings, these guard rings, when in the open state, can be very easily slipped onto a holding rail with a matching T-shaped cross-section to form a long row of rings, whereby the guard ring assembler can use one hand to hold a number of rings and use the other hand, possibly using a tool, to press the rings consecutively at the desired spacings along the line cable. In the process, when the half collars are forced together, the beaks bend apart enough so that the ring detaches from the holding rail at that moment when the locking hooks snap shut and the ring is mounted on the cable. In this manner the assembler can rapidly secure the rings one after the other onto the cable.

When the collars of the guard ring have a U-shaped channel as described above, very strong rings can be provided having good anti-slipping effect in the wet snow. As further noted, the camber of the hinge strap 3 favors opening of the T-shaped groove and furthermore makes the inside diameter of the ring somewhat flexible, this being advantageous in view of possible deviations in the diameter of the cable.

An assembly device or tool that can be used to set the guard rings about the cable 17 is shown in FIGS. 4 and 5. This device consists of two short lever arms 20 and 21 joined in tong-like manner by a pivot means 31 which can be compressed together by gripper arms 32 and 33, only partially shown. The jaws 22 at the end of arms 20 and 21 have oppositely directed tips or points 23 mounted thereon which are inserted, when the mouth of the tongs is open, into the grooves 15 between the sidewalls 13 and 14 of the half-collars 1 and 2. See FIG. 4. The end walls 19 and 18 adjacent locking hooks 6 and 7 at the two outer ends of the grooves 15 provide stop surfaces for the tips 23 so that upon compression of the jaws of the tongs, the hooks 6 and 7 will snap together about the cable wire 17. See FIG. 5.

When it is desired to place the guard rings around the cable without benefit of the holding rail 16 but still using the assembly tongs, a pin 24 is provided on lever arm 21 that projects into the mouth of the tongs for holding the ring in place between the jaw tips 23. The rear end of pin 24 is conveniently connected to a leaf-spring 25 on lever arm 21 so that it can be kept in place yet easily removed when not in use.

Because the outer diameters of long-distance transmission lines vary, the guard rings must be adapted to such diameters. Therefore, means are provided for adjusting jaws 22 by an amount "a" at the ends of lever arms 20 and 21 and transverse to these arms, whereby the spacing between the jaw tips 23 with respect to the compression surfaces 18 and 19 of the half collars 1 and 2 is adjustable.

When retrofitting extant long-distance transmission lines using the guard rings of the invention, local conditions will determine whether the lines must be lowered to the ground or whether an assembler, suspended in a cage, can move along the lines to put the guard rings in place. If the assembler has a firm footing, he can use one hand to hold the guard rings arrayed on the holding rail 16 to move the particular foremost guard ring to the cable, while using the other hand for the tongs, with which he can then compress ring after ring about the cable.

If, on the other hand, the assembler must work at an abnormal height or in a swinging cage, he will need one hand to move the cage along the cable and possibly also to hold on himself. In the latter case the assembly tongs are appropriately fitted with a magazine 26 as shown in FIGS. 7 and 8. This magazine 26 consists of a base 34 and two sidewalls 35 and is provided with a groove 27, corresponding to the web of the rail 16, to receive the holding rail loaded with guard rings. A guide-edge 28 projects from each sidewall 35 to guide the guard rings laterally through the magazine. Guard rings for this application are provided at the corresponding location with a guide notch 29 (FIG. 6) and are thus guided at three places within the magazine 26. The magazine is attached to the tongs as shown in FIG. 8 and includes a carriage 30, indicated merely in outline in FIG. 7, that is displaceably guided within the magazine and presses by spring force (not shown) against the last of the set of guard rings to ensure that after each guard ring has been set in place and after each opening of the tongs thereafter, the next ring will advance into the emplacement position in the tongs.

Thus the invention provides a further simplification and speed-up of the assembly process by providing assembly tongs in combination with a magazine for the guard rings, wherein they are kept on a T-rail and are advanced automatically after each assembly step. Such an assembly device can easily be actuated with only one hand allowing the assembler to use the other hand to hold himself if necessary.

I claim:

1. A guard ring for transmission cables for preventing snow accumulations on the cable surface, comprising two half collars constructed of a hard elastic plastic integrally joined at their inner ends by a hinge strap that permits the collars to move between open and closed positions; interlocking means at the free, outer ends of the collars that engage to form a closed ring around the cable, beaks integral with the inner ends of the half collars and facing each other in the area of the hinge, said beaks partially covering the hinge strap from both sides in such a manner that the beaks together with the hinge strap form a T-shaped groove when the half collars are in the open position and which beaks separate a distance approximately equal to the width of the top of the T-shaped groove when the half collars are in closed position.

2. The guard ring of claim 1, in which the interlocking means comprises interlocking hooks integral with the collars.

3. The guard ring of claim 1, in which the half collars comprise an arcurate band having the thickness of the hinge strap and integral sidewalls forming an outwardly opening U-shaped channel, said channel terminating short of the interlocking means at the free ends of the collars to form stops and said sidewalls terminating adjacent the hinge and forming the beaks.

4. The guard ring of claim 3, in which the hinge strap is cambered inwardly in a direction opposite to the arc of the half collars.

5. The guard ring of claim 3 in which the sidewalls of the half collars have guide notches.

* * * * *